United States Patent [19]

Gingras

[11] 4,236,084
[45] Nov. 25, 1980

[54] APPARATUS AND METHOD FOR IN-LINE ENERGIZATION AND DE-ENERGIZATION OF EXTERNAL LOADS IN SERIES WITH AN EXTERNAL SOURCE OF ELECTRICITY IN RESPONSE TO EXTERNALLY SENSED PARAMETERS

[76] Inventor: Richard P. Gingras, 40 North St., Ridgefield, Conn. 06877

[21] Appl. No.: 955,120

[22] Filed: Oct. 26, 1978

Related U.S. Application Data

[63] Continuation of Ser. No. 712,651, Aug. 9, 1976, which is a continuation-in-part of Ser. No. 575,341, May 7, 1975, Pat. No. 3,974,426.

[51] Int. Cl.³ .......................................... H01H 47/26
[52] U.S. Cl. .................................... 307/39; 307/117; 236/47
[58] Field of Search ................................ 307/38–41, 307/116, 117, 308, 310, 311; 219/480, 486; 361/211; 236/47, 68 B, 78 A

[56] References Cited

U.S. PATENT DOCUMENTS

| 3,337,741 | 8/1967 | Mislan | 307/41 |
|---|---|---|---|
| 3,352,490 | 11/1967 | Dalzell et al. | 236/68 |
| 3,523,182 | 8/1970 | Phillips et al. | 307/117 |
| 3,586,869 | 6/1971 | Kompelian | 307/117 |
| 3,761,018 | 9/1973 | Rekal | 307/39 |
| 3,768,545 | 10/1973 | Wilk | 307/39 |
| 3,854,033 | 12/1974 | Edge | 219/483 |
| 3,867,641 | 2/1975 | Collins | 307/117 |
| 3,868,638 | 2/1975 | Johnson | 307/117 |
| 3,869,619 | 3/1975 | Camillo | 307/117 |
| 3,944,841 | 3/1976 | Janke | 307/38 |
| 3,948,441 | 4/1976 | Perkins et al. | 236/46 R |
| 3,980,943 | 9/1976 | Cailleux et al. | 307/39 |
| 3,984,699 | 10/1976 | Bailey | 307/41 |
| 4,010,412 | 3/1977 | Forman | 307/39 |

FOREIGN PATENT DOCUMENTS 2218285 10/1973 Fed. Rep. of Germany .

OTHER PUBLICATIONS

SCR Manual, General Electric, 1972, p. 223.

Primary Examiner—John Gonzales
Assistant Examiner—W. J. Brady
Attorney, Agent, or Firm—Mattern, Ware, Davis & Stoltz

[57] ABSTRACT

A control system for energizing and de-energizing external loads in series with a source of electricity incorporates a rectifying network having inputs in series with the alternating current source and each external load. The control system incorporates one electronic switch, such as a triac, and one part of a rectifying network to energize and de-energize each external load. The triggering of a particular electronic switch is made in response to a desired combination of externally sensed parameters obtaining predetermined magnitudes. The same or different sensed parameters may also be used to activate any other external load when these sensed parameters obtain a second set of predetermined magnitudes, which may be identical with the first set of predetermined magnitudes.

33 Claims, 7 Drawing Figures

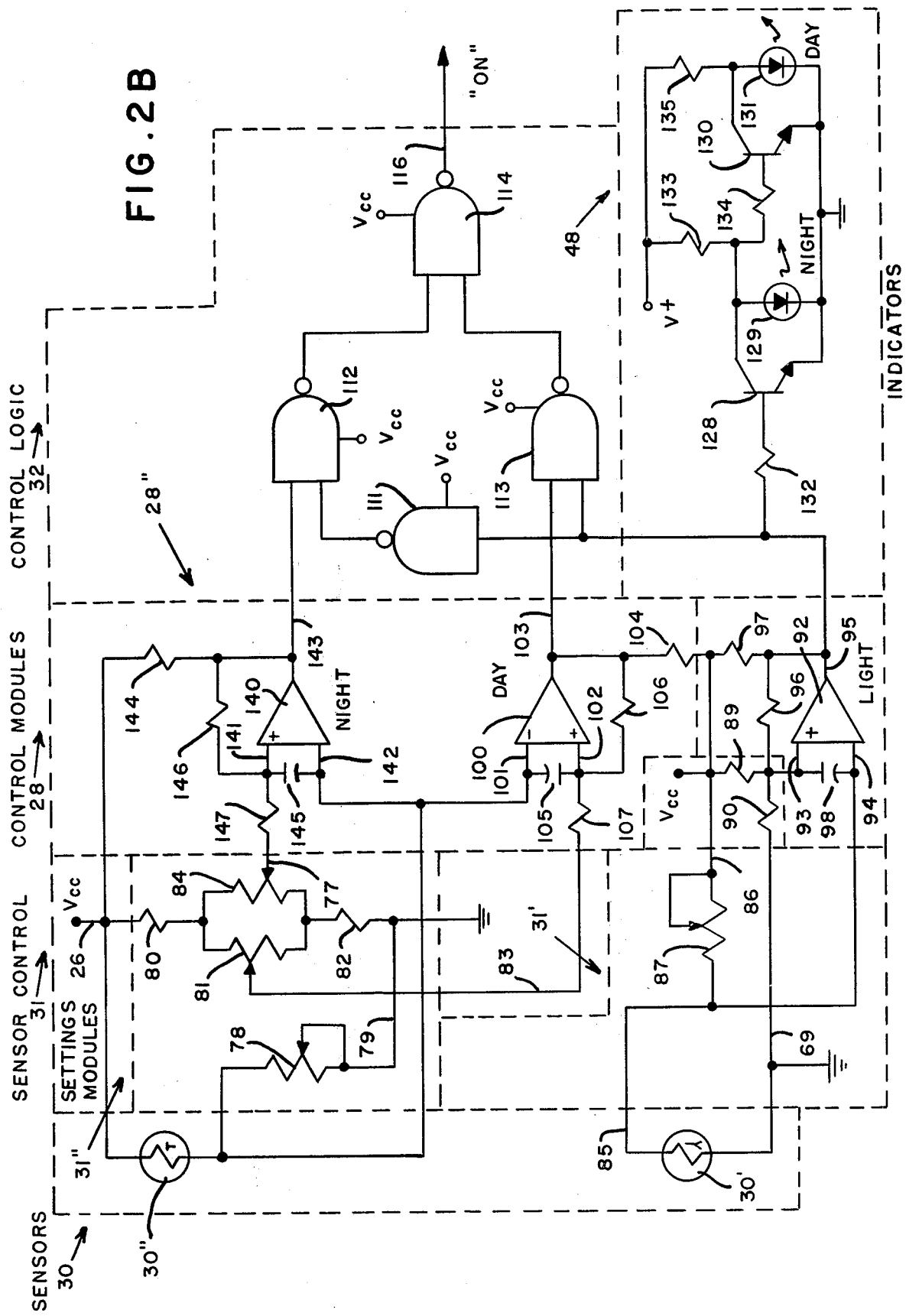

APPARATUS AND METHOD FOR IN-LINE ENERGIZATION AND DE-ENERGIZATION OF EXTERNAL LOADS IN SERIES WITH AN EXTERNAL SOURCE OF ELECTRICITY IN RESPONSE TO EXTERNALLY SENSED PARAMETERS

CROSS REFERENCE TO RELATED APPLICATIONS

The present application is a continuation application of U.S. patent application Ser. No. 712,651 filed Aug. 9, 1976 which in turn is a continuation-in-part application of U.S. patent application Ser. No. 575,341 filed May 7, 1975 which issued as U.S. Pat. No. 3,974,426 on Aug. 10, 1976. U.S. Pat. No. 3,974,426 and U.S. patent application Ser. No. 712,651 are hereby incorporated by reference.

BACKGROUND OF THE INVENTION

1. Field of the Invention

The present invention relates to control systems in series with external loads and an external source or sources of electricity so as to energize and de-energize the external loads with the external source or sources of electricity depending upon the combinatorial values of a plurality of sensed parameters.

2. Description of the Prior Art

Although there are several prior art patents that disclose the use of electronic switches to effectively complete the connection of an external load to an external source of electricity, none of the prior art patents disclose a control system for sensing the combination of a plurality of external parameters and to thereby control energization and de-energization of the load in response to this combination of parameters by a control system in series with the external load and the external source of electricity. Thus, in U.S. Pat. No. 3,558,996, Mitchell, a circuit is disclosed in which a silicon controlled rectifier shorts out a full-wave bridge but which does not sense external parameters. U.S. Pat. Nos. 3,597,662, Gary, and 3,584,263, Thompson, also use a thyristor to energize an external device but do not disclose the use of remote sensors and control circuitry to energize a thyristor upon the external parameters reaching predetermined levels. Similarly, U.S. Pat. No. 3,553,535, Weber, does not teach the use of control circuitry to drive an electronic switch in response to externally sensed conditions.

Although some U.S. patents disclose the electrical shorting of a full-wave rectifier bridge by a silicon controlled rectifier, none of these U.S. Patents disclose a control system in series with an external source of electricity and external loads so as to control the energization and de-energization of each load in response to a selected combination of a plurality of external sensed parameters. Thus, U.S. Pat. No. 3,818,247, Chambers et al, discloses the use of a silicon controlled rectifier to control a load in response to a sensed condition, but the device is not in series with an external source of electricity. U.S. Pat. No. 3,818,183, Masson, discloses an electronic temperature control system utilizing an electronic switch but the disclosed system only senses one parameter, temperature. U.S. Pat. Nos. 3,708,738, Crawford et al, 3,691,404, Sweigert, Jr., 3,629,681, Gurwicz, 3,486,105, Breniere, 3,440,517, Page et al, 3,392,626, Miller et al, 3,365,654, Vollrath, 3,231,812, Paley 3,331,013, Cunningham, and 3,146,392, Sylvan, all disclose electronic circuits utilizing a fullwave rectifier bridge and the effective shorting out of this bridge by an electronic switch, but none of these patents disclose the use of external sensors to control the operation of the electronic switch so as to activate the external load. U.S. Pat. No. 3,336,524, Healey also utilizes a full-wave bridge but this bridge is not in series with the source of electricity, and the electronic switches do not operate by sensing external parameters.

Although U.S. Pat. No. 3,365,654, Johnston discloses a fullwave bridge to control activation of a load in series with a source of electricity in response to an external sensor, only one sensor is disclosed and, in addition, the circuit is used for controlling the mean electrical power fed to a load rather than its activation or deactivation. Furthermore, Johnston utilizes an external oscillator for a portion of its control circuitry which incorporates a temperature sensing resistor. Thus, this portion of the control circuitry is not in series with the source of external electricity and the external load as is the present invention.

U.S. Pat. No. 3,783,368, Dosch et al, also discloses a control system in series with a source of external electricity and an external load so as to control the power to the external load. This patent discloses the use of a single sensor so as to control the average power to the external load. The use of a hysteresis effect for activation of the load is not disclosed and indeed, the purpose for the activation of the load is for controlling the duty cycle of the load. The present invention is not concerned with the varying duty cycle of external loads but their activation in response to the combinatorial value of a plurality of externally sensed parameters. The activation of external loads by the present invention is thus used to control external devices such as furnaces and air conditioning systems so as to maintain the furnace or air conditioning system in operation until the external load is de-energized. Thus, the present invention is an on-off type of controller, rather than a proportional type controller disclosed in Dosch et al.

SUMMARY OF THE INVENTION

A control system of the present invention is in series with N loads (N being an integer greater than one) connected to a source of electricity for energizing and de-energizing the loads in response to externally sensed parameters. The loads must be in one of two states; either a full ON state or a full OFF state depending upon the magnitudes of the selected externally sensed parameter and, optionally, the additional values of external control signals. The control system incorporates a full-wave rectifying network incorporating N+1 series connected front to back diode pairs, each pair forming a rectifying leg. The first diode pair is electrically connected at their junction to the common line of the external source of electricity while diode pairs number 2 to (N+1) are electrically connected at their respective junctions to LOAD 1 to LOAD N respectively. The full-wave rectifying network supplies electricity of one polarity to a direct current voltage regulator which generates an output of constant voltage to the control modules, the control logic modules, trigger modules, and indicators of the control system. The direct current voltage regulator incorporates circuitry which stores sufficient electrical energy to properly operate the control system even during times when and if all the electronic switches of the control system are activated.

The sensors of the present invention may be of any type that convert a sensed parameter to a direct current electrical signal either directly or with the aid of filters and detectors. Thus, in the preferred embodiment of the present invention a sensor monitors temperature while another sensor monitors ambient light. These sensors generate direct current electrical signals that are supplied to corresponding sensor control setting modules. These modules provide manual selection of the predetermined values corresponding to each sensor.

The outputs of the control setting modules are connected to control modules. The control modules each generate a signal corresponding to an ON or OFF state depending on the value of the corresponding sensed paremeter, or optionally, the value of an external control signal. Different control modules or different portions of the same control module may be associated with one sensor so as to combine in the control of more than one external load.

The outputs of the control modules are transferred to the control logic module of the present invention. The control logic module comprises up to N sections, each section for the control of at least one trigger module. In each section of the control logic module, combinations of the control module outputs are logically combined in a Boolean equation so as to produce an ON signal if the selected control module output signals satisfy the Boolean equation, and conversely to produce an OFF signal if the equation is not satisfied.

Each of the up to N control logic output signals in turn controls at least one of the N trigger modules of the present invention which correspondingly activate at least one of the electronic switches when the control logic output signal associated with the particular trigger module is in the ON state and turns off the electronic switch if the control logic output signal is in the OFF state. The electronic switches in the preferred embodiment of the present invention comprise triacs which electrically short circuit the diode-diode junctions of two legs of the rectifying network associated with a particular external load when activated and thereby connects the particular external load to the external source of alternating current electricity.

During each half cycle of the alternating current, even if all the loads are energized, a small amount of electrical energy is stored by the direct current voltage regulator so as to maintain the proper supply voltage to the control system. The voltage regulator may, of course, be replaced by a battery to supply the proper supply voltage.

In addition, the present invention incorporates one or more status indicators which are operable in one of two states depending upon the condition of the electronic switches.

Furthermore, in the preferred embodiment of the present invention, the temperature sensing control module incorporates a hysteresis-generating circuit which maintains the output of this particular control module in the ON state even though the sensed temperature is below the value which is initially required to generate the ON signal. This temperature swing, which is necessary to cause the control module to change to the OFF state, simulates the bi-metallic thermostat switch that the temperature sensor is simulating. Thus, when the ambient light in the room indicates that the room is lighted, the control system of the present invention overrides the existing temperature activated bi-metal thermostat switch of the furnace control. Thus, the temperature of the room is selectable by the temperature setting of the temperature sensor of the present invention. However, if the ambient light indicates that the room is dark—indicating that no one is occupying the particular room or area—a portion of the control system is de-activated and the temperature sensor is no longer able to activate one of the electronic switches. At this time, the existing temperature activated thermostat switch controls the furnace temperature, and this switch may preferably be maintained at a lower temperature than the temperature as set by the temperature trim setting of the present invention's temperature sensor; thereby saving on the use of energy during the dark hours of every day. Alternatively, the same load may be controlled for both its night and day settings by the present invention without the use of a bimetallic thermostat switch.

Furthermore, a second of the N electronic switches may control a second stage of heating if the first stage is insufficient to raise the temperature to the desired setting. Two or more stages of heating and cooling may thus be controlled by the present invention with or without the use of an existing bimetallic thermostat switch.

OBJECTS OF THE INVENTION

Therefore, it is a principal object of the present invention to provide a control system in series with an external load and an external source of electricity for energizing and de-energizing up to N separate external loads with the external source of electricity in response to combinations of pluralities of sensed parameters, where N is an integer greater than one.

An additional object of the present invention is to provide a control system of the above description which incorporates control circuitry which is supplied by electricity from the external source of electricity at all times including times when the control system energizes all the external loads.

A further object of the present invention is to provide a control system of the above description for use with an existing temperature activated or other automatic or manual external switch so as to override the control of this temperature activated switch during times when the room in which the control system is located has a predetermined amount of ambient light.

An additional object of the present invention is to provide a control system of the above description which may incorporate indicators for showing to the user the particular state of the control system.

A further object of the present invention is to provide a control system of the above description which may additionally be responsive to externally generated control signals for activating a portion or all of the control system.

An additional object of the present invention is to provide a control system of the above description that has a very low power consumption so as to maintain the external loads in the OFF state when the electronic switches of the present invention are in the OFF state even though a small amount of power is used by the present invention to maintain operating power to a portion of its electronic circuitry.

Other objects of the present invention will in part be obvious and will in part appear hereinafter.

THE DRAWINGS

For a fuller understanding of the nature and objects of the invention, reference should be had to the following detailed description taken in connection with the accompanying drawings.

FIG. 2B is a schematic diagram of a portion of the sensors, sensor control setting modules, control modules, control logic, and indicators of the control system shown in FIG. 1.

FIG. 2C is a diagram showing how FIGS. 2A and 2B are put together to form FIG. 2.

DETAILED DESCRIPTION

Figure 1:
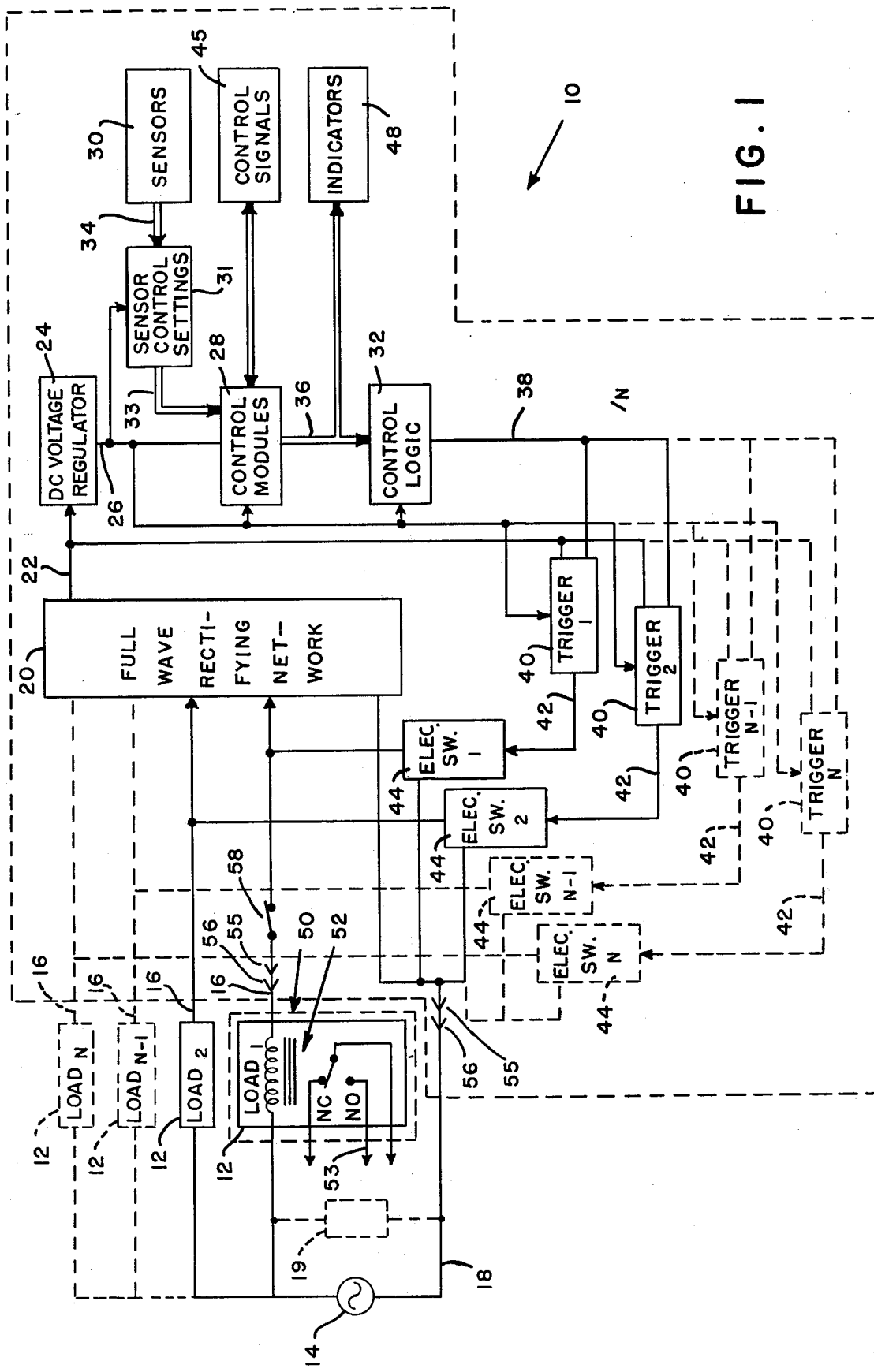
FIG. 1 is a block diagram of the present invention showing its interconnection with an external source of alternating electricity as well as external loads.

As may best be seen in FIG. 1, a control system 10, of the present invention incorporates a number of electronic circuit modules 20, 24, 28, 30, 31, 32, 40, 44, and 48 for performing the energization and de-energization of external loads 12, each in series with an external source of electricity 14, by effectively completing the electrical connection of the load to the external source of electricity. The activation of each load is from an OFF state to an ON state so that the present invention is in effect an ON-OFF type of control system. Furthermore, the present invention is in series with the external loads and the external source of electricity and performs its controlling function by effectively electrically short-circuiting a selected input line 16 that emanates from the selected load 12 to the input line 18 emanating from the power source 14. In one configuration, the load is a relay 52 and its normal energization and de-energization by an external temperature activated thermostat switch 19 is overriden at certain times by the present invention. In this configuration, as well as in many multi-load configurations, the electricity source 14 is approximately 24 VAC, and is typically the secondary side of a 115 VAC step-down transformer.

In the preferred embodiment of the present invention, a full-wave rectifying network 20 receives alternating electricity from the external source of electrical power 14 and rectifies this alternating source of electricity so as to yield an output (V+) of pulsating direct electricity on line 22. This output is connected to a direct current voltage regulator module 24 which produces a regulated constant output (Vcc) of direct current voltage at a predetermined level, preferably 5 VDC on line 26. This module incorporates electrical energy storage for maintenance of this direct current voltage during times when the output on line 22 of the full-wave rectifying module 20 is short-circuited.

As seen in FIG. 1, the output 26 (Vcc) of the direct current voltage regulator 24 supplies power to the control modules 28, the sensor control setting modules 31, the control logic module 32, the trigger modules 40 and indicators 48. Sensors 30 monitor external parameters such as temperature and light and generate an electrical sensor output signal 34 proportional to the externally sensed parameter. These outputs 34, as modified by the sensor control setting modules 31, having outputs 33, control the ON and OFF state of respective control modules 28. Thus, if the sensed external parameter is greater than a predetermined adjusted value, the output 34 of the sensor 30 will cause the corresponding control module 28 to generate a control module output 36 which will go from an OFF state to an ON state. These signals are electrically transferred to the control logic module 32 where, if the selected outputs 36 satisfy the Boolean equation represented by the logic module for a particular load or loads, the control logic will generate a control logic output 38 that is in the ON state for the particular load or loads and in all other situations generate an OFF output signal for that load or loads. It is apparent to one skilled in the art, that the control logic module may logically combine the outputs of the control modules in any manner in order to generate an ON or OFF control logic signal. All such logic combinations can be represented in Boolean equations such as the sum of products form $$Y = (X_{1,1} \cdot X_{1,2} \cdot \ldots \cdot X_{1,N}) + (X_{2,1} \cdot X_{2,2} \cdot \ldots \cdot X_{2,N_2}) + \ldots \cdot (X_{m,1} \cdot \ldots \cdot X_{m,N_m});$$

where Y is the output of a portion of the control logic module and $X_{1,1}, \ldots, X_{m,N_m}$ are inputs to the control logic modules from the control modules.

Thus, the outputs of the control logic module may be equated to their inputs by a Boolean equation. For instance, a control logic output 38 could be maintained in the ON state for all selected control module input signals except when all these signals are in the OFF state. The control module outputs 36 may also drive indicators 48 for informing the user of the status of the controller.

The outputs 38 of the control logic module 32 are electrically transferred to the trigger modules 40 where, for each trigger module, if an ON output signal is received, a trigger output signal 42 is generated that will periodically energize a corresponding electronic switch 44. The energization of the electronic switch causes the output of the electronic switch 44 to effectively couple the input line 16 of the corresponding external load to the input line 18 of the external source of electricity, thereby energizing that load. Thus, the electronic switch causes the corresponding external load 12 to be fully energized by the external source of electricity 14 and thereby causes the load 12 to go from the OFF state to the ON state.

As best seen in FIG. 1, the control system 10 may be adapted for providing overriding control to a temperature control unit 50 which may be a furnace or an air-conditioner, by activating a relay 52 representing the external load to the control system. The output of the relay may be two or three wires depending upon the particular furnace to be controlled. Thus, in a standard furnace control unit, a thermostat switch 19 closes if the ambient temperature equals a predetermined set temperature. The closure of the thermostat switch closes the electrical circuit from the source of alternating current electricity 14 to the furnace relay 52 thereby energizing the relay to close its normally open contact 53, and thereby energize the furnace control unit.

The present control system may be connected in parallel to the existing temperature activated thermostat switch 19 by means of male-female connectors 55 and 56. A switch 58 allows deactivation of this portion of the control system from the thermostat switch 19 during times when it is not desired for this portion of the control system to be operable, such as during prolonged absence from the area serviced by the furnace.

The full-wave rectifying network 20 is connected across input lines 16 and 18. The electrical values for these and all subsequent passive circuit elements are listed in Table 1.

TABLE 1

| Reference Numeral | Component Type | Value |
| --- | --- | --- |
| 47 | Resistor | 330 ohm |
| 49 | Capacitor | .47 ufd @100v |
| 51 | Varistor | metal oxide GE#V47ZA |
| 63,64 | Diode | 1N4148 |
| 70 | Resistor | 3.9K |
| 71 | Zener Diode | 1N753 |
| 73 | Transistor | 2N3568 |
| 74 | Resistor | 39Ω |
| 75 | Capacitor | 200 ufd @10v |
| 78 | Potentiometer | 50K |
| 80 | Resistor | 15K |
| 81,84 | Potentiometer | 20K |
| 82 | Resistor | 15K |
| 87 | Potentiometer | 500K |
| 89,90 | Resistor | 33K |
| 52,100,140 | Operational Amplifier | Motorola #MC3302P |
| 96 | Resistor | 100K |
| 97 | Resistor | 10K |
| 98,105,145 | Capacitor | .01 ufd @10v |
| 104 | Resistor | 56K |
| 106 | Resistor | 4.7 meg. |
| 107 | Resistor | 56K |
| 111,112,113,114 | NAND Gate | RCA #CD4011AE |
| 118,119 | Resistor | 10K |
| 120 | Resistor | 1K |
| 121 | Transistor | 2N4400 |
| 122 | Optical Coupler | Clairex #CLM6000 |
| 125 | Resistor | 470Ω |
| 128,130 | Transistor | 2N4400 |
| 129,131 | Light Emitting Diode | Monsanto MV5021 |
| 132,133,134,135 | Resistor | 10K |
| 144,147 | Resistor | 56K |
| 146 | Resistor | 4.7 meg |

The full-wave rectifying network comprises N+1 diode legs 60, each leg comprising two diodes 63 and 64 connected front-toback (cathode to anode) at junctions 65. N is an integer equal to the number of external loads 12. Any two legs 65 of the rectifying network 20 form a full wave bridge capable of generating output voltage (V+) on line 22 for driving the voltage regulator 24.

Figure 2A:
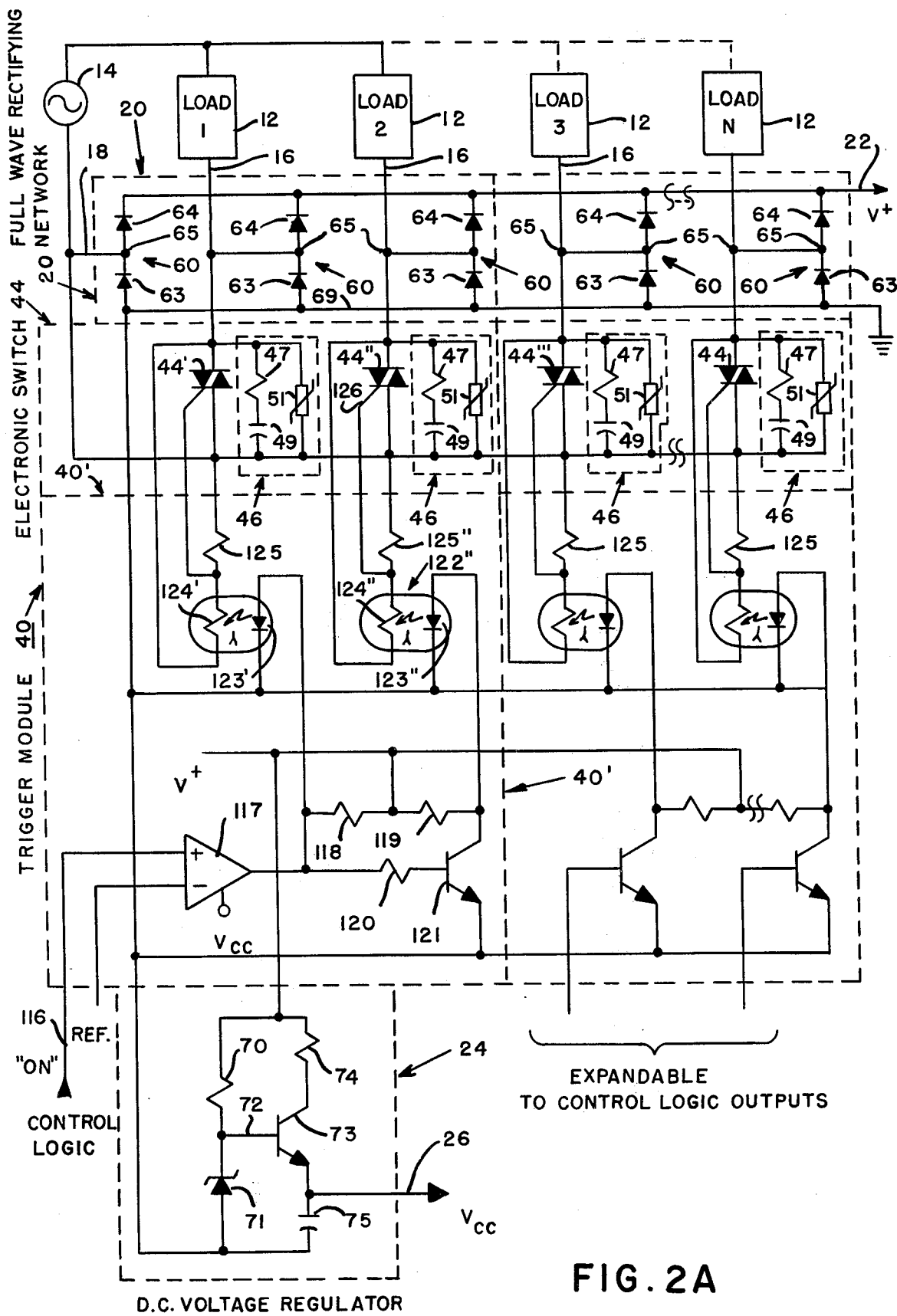
FIG. 2A is a schematic diagram of the full wave rectifying network, electronic switches, trigger modules and D.C. voltage regulator of the control system shown in FIG. 1.
Figure 2A:
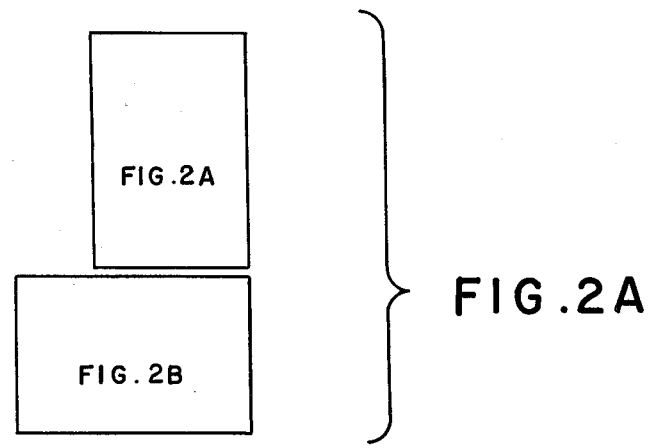
Figure 3A:
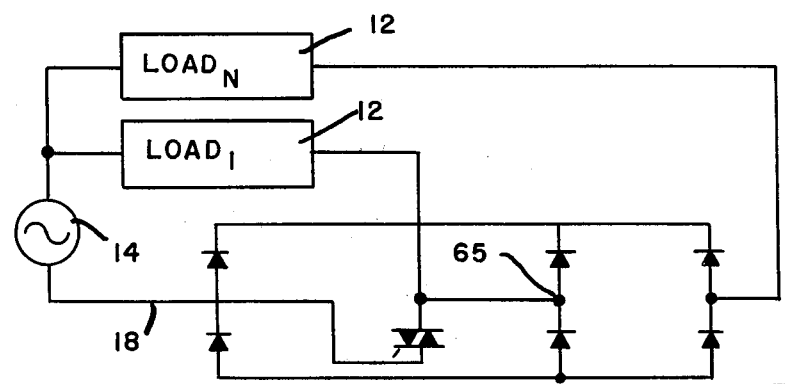
FIG. 3A is a schematic diagram of the rectifying network associated with LOAD 1 and LOAD n of the present invention and the electronic switch associated with LOAD 1.
Figure 3B:
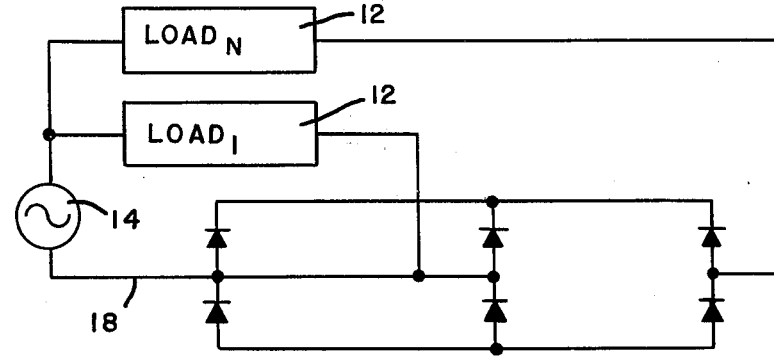
FIG. 3B is a schematic diagram similar to FIG. 3A showing the approximate electrical equivalent of the electronic switch of LOAD 1 when activated.
Figure 3C:
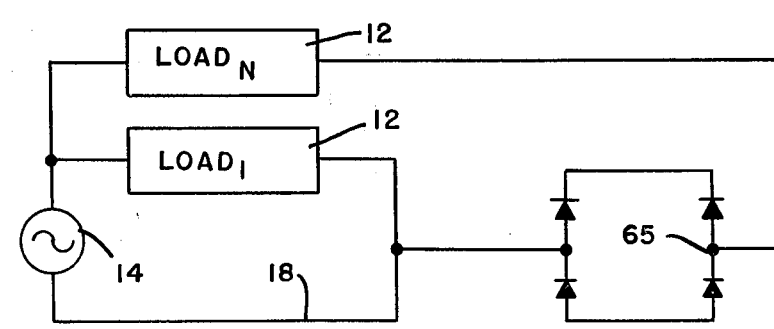
FIG. 3C is a schematic diagram similar to FIG. 3B showing the redundant resultant circuitry combined into an equivalent circuit.

As shown in FIG. 2A, the first diode leg connects to input line 18 from the external source 14. The remaining N diode legs each connect to one external load input 16 and one electronic switch 44. When an electronic switch is activated, the junction 65 of the corresponding diode leg 64 is electrically connected to the junction 65 of the diode leg connected to input line 18. This creates a direct current path from the corresponding load 12 by connecting corresponding input line 16 to the external source of electricity 14. As shown in the equivalent electrical diagrams of FIGS. 3A, 3B and 3C, the remaining loads are not energized by activation of the selected load since a full wave bridge is still "seen" by the other loads.

The direct current voltage regulator 24 receives the output from the fullwave recitying network and produces a regulated direct current voltage output (VCC) on line 26, preferably having a value of 6 VDC, which is connected to the sensor control setting modules 31, control modules 28, control logic module 32, trigger modules 40, and indicators 48 so as to properly bias these portions of the control system. The direct current voltage regulator comprises resistor 70 connected to zener diode 71 so as to produce a voltage on line 72 in order to bias transistor 73 thereby producing the regulated DC voltage output on line 26 across capacitor 75. Capacitor 75 has sufficient electrical storage capabilities so as to maintain the desired output voltage (VCC) on line 26 during times when the output line 22 of the full-wave rectifying network is effectively equal to the potential on ground line 69. This condition arises when all the electronic switches 44 of the present invention effectively short-circuit the rectifying network, as will be explained more fully later.

The sensors 30 measure external parameters and produce electrical signals in response thereto. Thus, as seen in FIG. 2B, a temperature sensor 30'', such as a thermistor, is shown which measures ambient temperature. This sensor is coupled to temperature sensor control setting module 31'' that comprises a potentiometer 78 having an output 79 connected to the corresponding control module 28''. The temperature sensor control module 31'' also incorporates resistors 80 and 82 and potentiometer 81 in parallel with the series combination of thermistor 77 of sensor 30'', and potentiometer 78, the total combination forming an electrical bridge. A portion of the voltage across potentiometer 81 is sensed and transferred to the corresponding control module by output line 83. This voltage corresponds to a desired daytime temperature. The potentiometer 78 in the temperature sensor control setting module allows the user to manually set the temperature which the user desires to have during the daytime. This sensor may ultimately regulate a load, such as relay 52, so as to override an existing thermostat switch 50, or it may be used in conjunction with a night temperature setting to directly control the load. Such a night temperature setting is obtained by potentiometer 84 through output line 77. Thus, if the temperature trim potentiometer 78 can be set at 70° F. and if the other sensors were equal to their predetermined levels for activation, the control system would then effectively connect the thermostat relay 52 to the alternating current source 14, thereby energizing the furnace control heating unit. It is thus seen that the particular setting of the existing thermostat switch 19, if one is used, is completely ignored by the control system during such times, and thus the control system in effect overrides the existing thermostat. It should be noted that a second temperature sensor control setting module and control module may be used to sense a second predetermined temperature so as to eliminate the existing temperature activated switch 19. This is precisely done by potentiometer 84 and output line 85.

As also seen in FIG. 2B, a light sensor 30', such as a resistive type photocell, is utilized for monitoring ambient light. This sensor generates an electrical voltage across output lines 85 and 69 whch are connected to a light sensor control setting module 31' incorporating a potentiometer 87. The output of this potentiometer 86 drives light control module 28' so as to activate this module if the ambient light is greater than a selected predetermined value. This light sensor potentiometer 87 is used to adjust the level of ambient light necessary for activating the control system. Connected in series with the potentiometer is the light sensor 30' which varies its internal resistance in inverse proportion to an increase in the ambient light level. Connected in parallel to the potentiometer and photo-resistor series combination is a pair of resistors 89 and 90, comprising a portion of light sensor control setting module 31', the combination forming an electrical bridge. Thus, as the ambient light increases, the photo-resistor internal resistance decreases, and the voltage polarity between output lines 85 and 86 switches from output line 85 positive to output line 86 positive. A hysteresis effect is generated by the parallel combination of resistor 96 and resistor 90 in series with photo-resistor 30' and potentiometer 87 in series with resistor 89. This electrical network maintains the operational amplifier in the ON state for levels of light slightly less than the amount necessary to initially turn on the operational amplifier. This hysteresis effect prevents small light variations from turning the control system on and off repeatedly.

As also shown in FIG. 2B, the light sensor 30' connects to light control module 28' which comprises an operational amplifier 92 with inputs 93 and 94 and output 95 which is connected to the logic module 32 as well as feedback resistor 96 and biasing resistor 97. A capacitor 98 is connected across input lines 93 and 94 for filtering purposes. Thus, during low ambient light conditions, the output line 85 is at a higher potential than output line 86 and therefore operational amplifier 92 is maintained in the OFF state. However, as the ambient light increases, the internal resistance of the photo-resistor decreases thereby causing output line 85 to have a lower potential than output line 86. When this change in voltage polarity occurs, the inputs 93 and 94 to the operational amplifier are such that the negative input 94 is more negative than the positive input 93. At this time, the operational amplifier 92 switches to the ON state, which in the present case is the VCC voltage from output line 26 of the DC voltage regulator module. This increased voltage on output line 95 passes current through feedback resistor 96 thereby making the potential between input lines 93 and 94 greater and consequently saturating the operational amplifier into the ON state. The potentiometer 87 may be adjusted so as to set the level of ambient light necessary for initial activation of the light control module 28'.

The temperature control module 28'' operates in an analogous fashion to the light control module 28' connected to the light sensor control setting module 31'. Thus, this control module also incorporates an operational amplifier 100 having input lines 101 and 102 and output line 103 as well as biasing resistor 104 and filter capacitor 105. This operational amplifier generates an output signal on line 103 corresponding to the DAY setting of temperature sensor 30''. The feedback network of this operational amplifier is similar to the light sensing control module in that a hysteresis temperature effect is incorporated in the feedback network. The feedback network comprises the series-parallel combination of resistor 106 and resistor 107, potentiometer 81, resistors 80 and 82 and potentiometer 78 in combination with temperature sensor 30''. The positive feedback supplied at the input 102 of the operational amplifier is equivalent to a voltage change representing 1° F. as produced by thermistor 30''.

Similarly, NIGHT operational amplifier 140 has input lines 141 and 142 and output line 143, as well as a biasing resistor 144 and filter capacitor 145. A similar hysteresis effect is generated by feedback resistor 146 in combination with the series-parallel combination of resistor 147, potentiometer 87, resistors 80 and 82, potentiometer 78 and light sensor 30''. This hysteresis effect maintains output line 143 in the ON state for values of temperature up to 1° F. more than initially required to turn on operational amplifier 140.

Thus, when the ambient temperature is low, the internal resistance of the thermistor 30'' is high thus making output line 79 at a lower potential than the DAY line 83. However, as the ambient temperature increases, the internal resistance of thermistor 30'' decreases causing output line 79 to have a higher potential than DAY output line 83. At this time, the operational amplifier 100 is turned to the ON, or higher voltage state, having an output voltage equal to the VCC voltage of output line 26 of the DC voltage regulator. Also, at this time, the feedback network causes input line 101 to be at an even higher potential than input line 102, thus saturating operational amplifier 100. The hysteresis effect as explained earlier is then generated.

Thus, the voltage on the temperature sensor DAY output line 83 may decrease by an amount equal to the voltage drop across resistor 107 without having any effect on the turn-on of the operational amplifier. Indeed, the output line 83 must have a negative potential with reference to output line 79 of sufficient magnitude to cause the feedback current from the feedback network to prevent this feedback from biasing input line 101. At this time, the input line 101 will be at a lower potential than input line 102 and the operational amplifier will revert to its OFF state.

Just as the DAY operational amplifier 100 is turned ON when the thermistor 30'' is above a predetermined level as set by potentiometers 78 and 81, so the NIGHT operational amplifier 140 is turned ON when the thermistor 30'' is above some other, usually lower, predetermined level as set by potentiometers 78 and 86.

It will be readily apparent to one of ordinary skill in the art that more than two temperature settings may be used in the present control system by simply utilizing more control modules analogous to the DAY or NIGHT circuitry of control module 28'' in conjunction with additional potentiometers analogous in function to potentiometers 81 and 84. It will also be obvious to one of ordinary skill in the art to use additional sensors for performing other types of control functions. Such sensors could be smoke detectors, pressure sensors, time sensors (clocks), wind sensors, strain gauges, and humidity sensors to name a few. The present invention is thus adapted for controlling any type of apparatus by utilizing sensor outputs to control two or more external loads in series with a source of external electricity.

As shown in FIG. 2B, the outputs 75, 103, and 143 of the control modules 28' and 28'' are connected to a portion of the control logic module 32. One portion of the control logic is shown having an output line 116 for driving trigger module 40', which in turn energizes electronic switches, 44' and 44'', and thus LOAD 1 and LOAD 2. In this particular illustration, output signal 116 energizes LOADS 1 and 2 at two different temperature settings, a DAY temperature and a NIGHT temperature. Other loads may also be controlled by additional portions of the control logic module, such as a load for two-step heating if the temperature does not reach the desired setting within some predetermined time limit. A timer (not shown) could be utilized in conjunction with the temperature control module 28" for controlling this third load, which could be a relay to energize a second furnace. It is thus apparent that up to N loads may be controlled by the present control system, where each load is controlled by one or more sensors in some Boolean combination of the desired sensors. Control signals may also be used solely or combined with one or more sensors to control one or more of these loads.

The portion of the control logic shown in FIG. 2B energizes, or turns ON, line 116 by use of NAND gates 111, 112, 113 and 114. These gates in turn line 116 ON if the ambient light is greater than a predetermined level and the temperature is below the DAY setting, or if the ambient light is below the predetermined level and the temperature is below the NIGHT setting.

As shown in FIGS. 2A and 2B, the output line 116 of NAND gate 114 is connected to the trigger module 40". Trigger module 40' comprises operational amplifier 117, resistors 118, 119, and 120 as well as transistor 121. Thus, when output line 116 is in the ON or high voltage state, the transistor 121 is saturated. The collector of transistor 121 is connected to an optical coupler 122" having a light emitting diode (LED) 123" which is maintained in the OFF state when transistor 121 is saturated. With LED 123" in the OFF state, photoresistor 124" exhibits a high resistance, thus maintaining the corresponding electric switch 44" in the OFF state due to the low voltage drop across resistor 125". With electronic switch 44" in the OFF state, LOAD 2 is also in the OFF state. The electronic switches 44 are preferably triacs, but may also be other electronic bi-directional switches, such as back to back silicon controlled rectifiers (SCR's). The triacs 44 are protected against high voltage transients by snubber circuits 46, each incorporating a resistor 47, a capacitor 49 in series with the resistor 47, and a varistor 51 in parallel with the resistor-capacitor combination.

The LED 123' corresponding to LOAD 1 is connected to the output of operational amplifier 117. If control logic output signal 116 is in the ON or high state, the operational amplifier output is also high, thereby driving LED 123'. LED 123' thereby reduces the resistance of photoresistor 124' which in turn causes a larger voltage drop to appear across resistor 125'. This voltage drop across resistor 125' activates the gate 126' of triac 44'.

Thus, when output signal 116 is ON, LOAD 1 is energized and LOAD 2 is de-energized. Similarly, when control signal 116 is OFF, LOAD 1 is de-energized and LOAD 2 is energized. Such a load energization scheme may be utilized in controlling a combined heating and air-conditioning system or a motorized valve where the energization of load 1 opens the valve and the energization of load 2 closes the valve. Thus, if LOAD 1 is ON, LOAD 2 is OFF, and vice versa. LOAD 1 is energized at the DAY temperature if DAY ambient light is present and is energized at the NIGHT temperature if NIGHT less than DAY ambient light is present.

The remaining LOADS are similarly controlled by other control logic output signals 38, each signal controlling one or more trigger modules 40. Each control logic signal is a function of one or more of the sensed external parameters and optionally may also be a function of one or more control signals 45, solely or in combination with one or more externally sensed parameters. Thus all N LOADS are controlled by the present invention.

An indicator module 48 is connected across the control module 28'. The indicator module incorporates transistors 128 and 130, respectively controlling LED's 129 and 131 so that DAY LED 131 is activated when LIGHT control module 28' is activated (ON) and NIGHT LED 129 is activated when control module 28 is deactivated (OFF).

It should also be noted that during times when all the electronic switches 44 are energized; i.e., when the output 38 of the control logic module are all in the high state, a small voltage does appear across the output of the full-wave rectifying network 20 because of the voltage drop across each triac 44 during the off portion of each half cycle prior to energization by the trigger module. This small amount of voltage during a small portion of each half cycle of alternating current provides the additional electrical energy needed to maintain the output 26 of the direct DC voltage regulator at its desired level. The reason that such a small voltage for such a small period of time during each half cycle of the alternating current source is sufficient to maintain the VCC voltage at this desired level is due to the low power consumption of the control electronics of the sensors 30, the control modules 28, the control logic module 32, and trigger modules 40. Typically, 10 to 30 milliamperes at the VCC voltage of 5 VDC is sufficient to maintain the proper operation of these modules.

Thus, the present invention not only controls the external loads in response to the externally sensed parameters, but it also maintains proper operating voltages for its control electronics even when the control system energizes all the external loads.

Furthermore, due to the fact that the power consumption of the control electronics of the control system is in the milliwatt range when CMOS integrated circuits are utilized for the operational amplifiers in the control modules 28 and trigger modules 40 and the logic gates of the control logic module 28, the current drain by the control system is insufficient to activate the external loads 12. Typically, to activate an external load such as relay 52, a current of more than 300 milliamperes is required while the control electronics only requires approximately 10 milliamperes.

Thus, the control system is able to override an existing temperature activated thermostat switch 19 in a furnace or air conditioning control unit so as to maintain the ambient temperature at some desired range during times when the ambient light indicates that the room is lighted and therefore in use. Furthermore, during the nighttime, when the light sensor of the present invention indicates that the higher ambient temperature is no longer desired, the control system can revert control back to the existing temperature activated thermostat switch 19 which may therefore be set at a low temperature. Also, the present multiload control system can provide control of multiple external loads, such as two stage heating and cooling with or without the use of existing temperature activated thermostat switches. As shown in FIG. 2A, such two stage yeating and cooling can be performed by additional LOADS 3 and N, with trigger module 40''' activating triac 44''' when the rate of heat rise is below a predetermined level or the desired temperature is not reached by some predetermined time. LOAD 3 could activate an additional furnace. Transistor 121''' could be driven by an additional portion of the control logic module 32 (not shown) that generates an ON signal in response to too slow a temperature rise with respect to rate of change or time. The existing temperature sensor 30" in combination with a clock could be utilized to drive an additional control module for providing signals to this additional portion of the control logic module.

LOAD N, which here could be LOAD 4, could similarly activate an additional air-conditioning unit if the rate of cooling is less than some desired amount.

It should be noted that the present invention when connected to a furnace or air conditioning control unit, is able to reduce the consumption of fuel by automatically maintaining the nighttime temperature at a predetermined, lower energy consumption level than the daytime temperature for the dwelling heated by the furnace or cooled by the air conditioning unit. The present invention is superior in operation to other fuel-saving devices for furnaces since it will not de-activate at night when the lights in the building or dwelling are on. Other fuel-saving devices utilize timers that connect a second thermostat switch or readjust an existing thermostat to a lower setting or to activate a small heater under an existing thermostat so as to lower the dwelling temperature. The timers in all these devices must be reset every time the occupants of the dwelling are awake beyond their normal bedtimes, or else the nighttime setting of the device will take over.

It is readily apparent that the present invention may also be used to sense other parameters such as air pressure, hot water temperature, humidity, sound, or any other parameter that may be electrically sensed to control a variety of external loads which have an ON or OFF type desired control. Thus, the present invention may be used not only to control furnace or air-conditioning control units but may also be used to control any type of device utilizing an on-off type of activating unit or solenoid.

It should be noted that external control signals may optionally communicate with some or all of the control modules to change their states.

Thus, what has been described is a control system for use in series with multiple external loads as well as an external source of electricity so as to energize or deenergize the external loads in response to the combination of a plurality of sensed parameters. The sensed parameters may be temperature, ambient light, pressure, sound, or any other parameter which may be converted into an electrical signal.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A control system for controlling the energization and de-energization of N electrical loads in response to external parameters, each load having a first output line connected in series with a first line of a source of alternating current electricity, and each load having at least a second output line which if connected to a second line of the alternating current electricity would energize the load, and if disconnected from the second AC line would de-energize the load, where N is an integer greater than one, comprising:

(A) a full-wave rectifying network having at least N+1 rectifying legs, each leg having first and second unipolarity current passing elements electrically connected to each other at the cathode of the first element and the anode of the second element forming a junction and the anode of the first unipolarity elements electrically connected to each other and the cathodes of the second unipolarity elements electrically connected to each other, the first rectifying leg having an input terminal at said junction for connection to the second line of the source of alternating current electricity, and each of the remaining rectifying legs having an input terminal at said respective junction for connection to the second line of one of the N loads so that the rectifying network is powered by the alternating current electricity in series with the loads, said rectifying legs generating a unipolarity voltage output across the anodes of the first unipolarity elements and the cathodes of the second unipolarity elements;

(B) means, connected to the output of the rectifying network, for voltage regulating said unipolarity voltage;

(C) means, connected to and powered by the output of voltage regulating means for generating an electrical signal in response to the magnitude of each sensed external parameters;

(D) control module means, each connected to one of the sensing means and powered by the output of the voltage regulating means, for generating electrical control output signals, each control output signal having a first, ON, value if the sensed parameter is greater than a pre-determined value and a second, OFF, value if the sensed parameter is otherwise;

(E) control logic means, powered by the output of the voltage regulating means, having sections for controlling all of the N loads, each section connected to at least one of the outputs of the control module means for generating a control logic output signal that is of a first, ON, value if the output signals of the associated control module means satisfy the Boolean equation representing the section of the control logic means, and is a second, OFF, value if the Boolean equation is not satisfied;

(F) triggering means, powered at least in part by the unipolarity output of the full-wave rectifying network, having inputs each connected to one of the outputs of one of the control logic means, for generating a trigger voltage signal if the corresponding control logic output signal is one, but only for one, of the following values, ON or OFF; and (G) electronic switching means, having a plurality of inputs, each input connected to one of the trigger voltage signals of the triggering means, and electrically connected across the cathode-anode junction of the corresponding rectifying leg to the cathode-anode junction of the corresponding rectifying leg to the cathode-anode junction of the first rectifying leg, for effectively electrically connecting the corresponding input terminals of the rectifying network if a trigger voltage signal is present and for effectively disconnecting the corresponding input terminals of the rectifying network from each other if the trigger voltage signal is not present; whereby each load is energized by the alternating current electricity source if the sensed external parameters selected for that load satisfy the Boolean equation represented by the corresponding section of the control logic module, and the load is de-energized if any of the selected sensed external parameters do not satisfy the corresponding Boolean equation, and whereby the control system is powered by the alternating current source in series with the loads.

2. A control system as defined in claim 1, further comprising:
(H) indicators, connected to the output of at least a portion of the control module means, for indicating the state of at least one of the sensed external parameters.

3. A control system as defined in claim 2, wherein the indicators comprise light emitting diodes.

4. A control system as defined in claim 1, wherein the electronic switching means incorporates triacs.

5. A control system as defined in claim 4, wherein the triggering means incorporates optical couplers electrically connected between the control logic means and the triacs for isolating the triacs from the control logic means while providing for energization and de-energization of the triacs.

6. A control system as defined in claim 1, wherein each control module means incorporates an operational amplifier for sensing the electrical signal from the corresponding sensing means and generating an output signal in response thereto.

7. A control system as defined in claim 6, wherein at least a portion of the control module means incorporates additional means for maintaining the corresponding electrical control output signal in the ON state unless the sensed parameter is less than said predetermined value by a selected magnitude.

8. A control system as defined in claim 1, wherein the voltage regulating means comprises a zener diode connected to the input of a transistor and wherein the output of the transistor is connected to a capacitor for storing electrical energy.

9. A control system as defined in claim 1 further comprising:
(H) an electrical snubber electrically connected across each electronic switch for protecting the control circuit from high voltage transients.

10. A control system as defined in claim 1, further comprising:
(H) sensor control setting modules electrically connected to the external parameter signalling means and the control module means for setting the predetermined value of the sensed parameters.

11. A control method for controlling the energization and de-energization of N external loads in response to a logical combination of a least two sensed parameters, each having a first, OFF, low current state and a second, ON, high current state and each separately connected in series to one side of an external source of electricity, where N is an integer greater than one, comprising the steps of:
(A) rectifying the output of the series combination of each external load and the source of electricity in combination with the other side of the external source of electricity for generating an output voltage of unipolarity;
(B) individually sensing the parameters by generating electrical signals proportional to the magnitude of the corresponding sensed parameter;
(C) for each sensed parameter and for each of a possible plurality of predetermined values associated with the sensed parameter, generating a discrete ON electrical signal if the electrical signal of the sensed parameter is greater than the corresponding magnitude of a particular predetermined value and generating a discrete OFF electrical signal if the sensed parameter is below the respective predetermined value;
(D) generating from one to N logic signals, each signal having a first discrete logic ON electrical signal if at least two selected signals of Step C satisfy a predetermined Boolean equation and generating a second, discrete logic OFF electrical signal if the selected signals of Step C do not satisfy the Boolean equation;
(E) for each of the logic signals of Step D, generating at least one trigger voltage signal if the logic electrical signal is ON or OFF; and
(F) for each of the N external loads, effectively electrically connecting the outputs of the series combination of the external load with one side of the source of electricity with the other side of the electricity source if the trigger voltage signal associated with the load is generated and effectively disconnecting the load from the other side of the electricity source if the trigger voltage signal is not generated; and
(G) utilizing the generated unipolarity output voltage of Step A for providing the electrical power to perform Steps B through F;

whereby each of the N external loads is energized by the external source of electricity if the corresponding trigger voltage is generated as a result of selected sensed parameters satisfying a corresponding Boolean equation and disconnecting the load if this Boolean equation is not satisfied.

12. A control method as defined in claim 11, wherein Step G comprises the step of voltage regulating the generated unipolarity output voltage of step A at a predetermined value and storing electrical energy at the predetermined voltage value.

13. A control system for controlling the energization and de-energization of N electrical loads in response to external parameters, each load having a first output line connected with a first line of a source of alternating current (AC) electricity, and each load having at least a second output line which if connected to a second line of the AC electricity would energize the load, and if disconnected from the second AC line would de-energize the load, where N is an integer greater than 1, comprising:
(A) a full-wave rectifying network having at least N+1 rectifying legs, each leg having the cathode of a first diode electrically connected to the anode of a second diode, thus forming a junction, and the anodes of the first diodes electrically connected to each other and cathodes of the second diodes electrically connected to each other, the first rectifying leg having an input terminal at its cathode-anode junction for connection to the second line of the source of alternating current electricity, and each of the remaining rectifying legs having an input terminal at said respective cathode-anode junction for connection to the second output line of one of the N loads, so that the rectifying network is powered by the alternating current electricity in series with the loads, said rectifying legs generating a unipolarity voltage output across the anodes of the first diodes and the cathodes of the second diodes;
(B) means for generating an electrical signal in response to the magnitude of each sensed external parameter;
(C) control module means, each connected to one of the sensing means electrical signals for generating electrical control output signals, each control output signal having a first, ON, value if the sensed parameter is greater than a predetermined value and a second, OFF, value if the sensed parameter is otherwise;
(D) control logic means, having sections for controlling all of the N loads, each section connected to at least one of the outputs of the control module means, for generating a control logic output signal that is of a first, ON, value if the output signals of the associated control module means satisfies the Boolean equation representing the section of the control logic means, and is a second, OFF, value if the Boolean equation is not satisfied;
(E) triggering means, having inputs each connected to the output of one of the control logic means, for generating a trigger voltage signal if the corresponding control logic output signal is one, but only one, of the following values, ON or OFF;
(F) electronic switching means, having a plurality of inputs, each input connected to one of the trigger voltage signals of the triggering means, and electrically connected across the cathode-anode junction of the corresponding rectifying leg to the cathode-anode junction of the first rectifying leg, for effectively electrically connecting the corresponding input terminals of the rectifying network if a trigger voltage signal is present, and for effectively disconnecting the corresponding input terminals of the rectifying network from each other if the trigger voltage signal is not present; and
(G) means for powering at least the external parameter sensing means, control module means, control logic means, and triggering means by the unipolarity voltage output across the anodes of the first unipolarity diodes and the cathodes of the second unipolarity diodes of the fullwave rectifying network regardless of the number of loads energized by the electronic switching means;
whereby each load is energized by the alternating current electricity source if the sensed external parameters selected for that load satisfy the Boolean equation represented by the corresponding section of the control logic module, and the load is de-energized if any of the selected sensed parameters do not satisfy the corresponding Boolean equation, and further whereby the control system is powered by the AC electricity source in series with the loads.

14. A control system as defined in claim 13 further comprising:
(H) sensor control setting modules electrically connected to the external parameter signalling means and the control module means for setting the predetermined value for the sensed parameters.

15. A control system as defined in claim 14, wherein at least a portion of the control module means incorporates additional means for maintaining the corresponding electrical control output signal in the ON state unless the sensed parameter is less than said predetermined value by a selected magnitude.

16. A control system as defined in claim 15 further comprising:
(I) indicators, connected to the output of at least a portion of the control module means, for indicating the state of at least one of the sensed external parameters.

17. A control system as defined in claim 16, wherein the indicators comprise light-emitting diodes and the electronic switching means incorporate triacs.

18. A control system as defined in claim 17, wherein the triggering means incorporates optical couplers electrically connected between the control logic means and the triacs for isolating the triacs from the control logic means while providing for energization and de-energization of the triacs.

19. A control system as defined in claim 18 further comprising:
(J) an electrical snubber electrically connected across each triac for protecting the control circuit from high voltage transients and rapid changes in voltage.

20. A control system as defined in claim 19, wherein the control module means incorporates an operational amplifier for sensing the electrical signal from the corresponding sensing means and generating an output signal in response thereto.

21. A control system for controlling the energization and de-energization of N electrical loads in response to external parameters, each load having a first output line connected with a first line of a source of alternating current (AC) electricity, and each load having at least a second output line which if connected to a second line of the AC electricity would energize the load, and if disconnected from the second AC line would deenergize the load, where N is an integer greater than 1, comprising:
(A) a full-wave rectifying network having at least N+1 rectifying legs, each leg having the cathode of a first diode electrically connected to the anode of a second diode, thus forming a junction, and the anodes of the first diode electrically connected to each other and cathodes of the second diodes electrically connected to each other, the first rectifying leg having an input terminal at its cathode-anode junction for connection to the second line of the source of alternating current electricity, and each of the remaining rectifying legs having an input terminal at said respective cathode-anode junction for connection to the second output line of one of the N loads, so that the rectifying network is powered by the alternating current electricity in series with the loads, said rectifying legs generating a unipolarity voltage output across the anodes of the first diodes and the cathodes of the second diodes;
(B) means for generating an electrical signal in response to the magnitude of each sensed external parameter;
(C) control module means, each connected to one of the sensing means electrical signals for generating electrical control output signals, each control output signal having a first, ON, value if the sensed parameter is greater than a predetermined value and a second, OFF, value if the sensed parameter is otherwise;
(D) control logic means, having sections for controlling all of the N loads, each section connected to at least one of the outputs of one of the control module means, for generating a control logic output signal that is of a first, ON, value if the output signals of the associated control module means satisfies the Boolean equation representing the section of the control logic means, and is a second, OFF, value if the Boolean equation is not satisfied;

(E) triggering means, having inputs each connected to the output of one of the control logic means, for generating a trigger voltage signal if the corresponding control logic output signal is one, but only one, of the following values, ON or OFF; and (F) electronic switching means, having a plurality of inputs, each input connected to one of the trigger voltage signals of the triggering means, and electrically connected across the cathode-anode junction of the corresponding rectifying leg to the cathode-anode junction of the first rectifying leg, for effectively electrically connecting the corresponding input terminals of the rectifying network if a trigger voltage signal is present, and for effectively disconnecting the corresponding input terminals of the rectifying network from each other if the trigger voltage signal is not present;

whereby each load is energized by the alternating current electricity source if the sensed external parameters selected for that load satisfy the Boolean equation represented by the corresponding section of the control logic module, and the load is de-energized if any of the selected sensed parameters do not satisfy the corresponding Boolean equation.

22. A control system as defined in claim 21 further comprising:

(G) sensor control setting modules electrically connected to the external parameter signalling means and the control module means for setting the predetermined value for the sensed parameters.

23. A control system as defined in claim 21, wherein at least a portion of the control module means incorporates additional means for maintaining the corresponding electrical control output signal in the ON state unless the sensed parameter is less than said predetermined value by a selected magnitude.

24. A control system as defined in claim 21, further comprising:

(H) indicators, connected to the output of at least a portion of the control module means, for indicating the state of at least one of the sensed external parameters.

25. A control system for controlling the energization and de-energization of N electrical loads in response to conditions or control signals, at least one load controlled in response to two or more conditions or control signals, each load having a first output line connected in series with a first line of a source of alternating current electricity, and each load having at least a second output line which if connected to a second line of the alternating current electricity would energize the load, and if disconnected from the second AC line would de-energize the load, where N is an integer greater than one, comprising:

(A) a rectifying network having at least one rectifying leg, each leg having at least one unipolarity current passing element, each rectifying leg having an input terminal for connection to at least one of the N loads so that the rectifying network is powered by the alternating current electricity in series with the loads, each rectifying leg generating a unipolarity voltage output;

(B) means, connected to the output of the rectifying network, for voltage regulating said unipolarity voltage;

(C) means, for generating an electrical signal in response to each condition and optionally for generating additional electrical signals corresponding to control signals;

(D) control module means, each connected to one of the signals of the electrical signal generating means for generating at least one electrical control output signal, each control output signal having a first, ON, value if the condition or control signal is greater than a predetermined value and a second, OFF, value if the condition or control signal is otherwise;

(E) control logic means, having sections for controlling all of the N loads, each section connected to at least one output of the control module means, for generating a control logic output signal that is of a first, ON, value if the output signal or signals of the associated control module means satisfy the Boolean equation representing the section of the control logic means, and is a second, OFF, value if the Boolean equation is not satisfied;

(F) triggering means, conditioned by the unipolarity output of the rectifying network, having inputs each connected to one of the outputs of one of the control logic means, for generating a trigger voltage signal if the corresponding control logic output signal is either ON or OFF; and (G) electronic switching means, having a plurality of inputs, each input connected to one of the trigger voltage signals of the triggering means, and electrically connected between the second line of one of the loads and the second line of the AC electricity for effectively electrically connecting the particular load to the AC electricity if a trigger voltage signal is present, and for effectively disconnecting the particular load from the AC electricity if the trigger voltage signal is not present;

whereby each load is energized by the alternating current electricity source if each condition or control signal selected for that load satisfies the Boolean equation represented by the corresponding section of the control logic module, and the load is de-energized if any selected condition or control signal does not satisfy the corresponding Boolean equation, and whereby the control system is powered by the alternating current source in series with the loads.

26. A control system as defined in claim 25, further comprising:

(H) indicators, connected to the output of at least a portion of the control module means, for indicating the state of at least one of the conditions.

27. A control system as defined in claim 26, wherein the indicators comprise light emitting diodes.

28. A control system as defined in claim 25, wherein the electronic switching means incorporates triacs.

29. A control system as defined in claim 25, further comprising:

(H) an electrical snubber electrically connected across each electronic switch for protecting the control circuit from high voltage transients and rapid changes in voltage.

30. A control system as defined in claim 25, further comprising:

(H) sensor control setting modules electrically connected to the electrical signal generating means and the control module means for setting the predetermined values for at least one of the conditions.

31. A control system for controlling the energization and de-energization of N electrical loads in response to the conditions or control signals, at least one load controlled in response to two or more conditions or control signals, each load having a first output line connected with a first line of a source of alternating current (AC) electricity, and each load having at least a second output line which if connected to a second line of the AC electricity would energize the load, and if disconnected from the second AC line would de-energize the load, where N is an integer greater than 1, comprising:

(A) means, connected to at least one load, for rectifying the AC electricity;

(B) means for generating an electrical signal in response to each condition or control signal;

(C) control module means, each connected to one of the signals of the electrical signal generating means for generating electrical control output signals, each control output signal having a first, ON, value if the condition is greater than a pre-determined value and a second, OFF, value if the condition is otherwise;

(D) control logic means, having sections for controlling all of the N loads, each section connected to at least one output of the control module means, for generating a control logic output signal that is of a first, ON, value if the output signal or output signals of the associated control module means satisfy the Boolean equation representing the section of the control logic means, and is a second, OFF, value if the Boolean equation is not satisfied;

(E) triggering means, having inputs each connected to the output of one of the control logic means, for generating a trigger voltage signal if the corresponding control logic output signal is either ON or OFF;

(F) electronic switching means, having a plurality of inputs, each input connected to one of the trigger voltage signals of the triggering means, and electrically connected between the second line of one of the loads and the second line of the AC electricity for effectively electrically connecting the particular load to the AC electricity if a trigger voltage signal is present, and for effectively disconnecting the particular load from the AC electricity if the trigger voltage signal is not present; and (G) means for powering the electrical signal generating means, control module means, control logic means, or triggering means by the rectifying means regardless of the number of loads energized by the electronic switching means;

whereby each load is energized by the alternating current electricity source if the conditions or control signals selected for that load satisfy the Boolean equation represented by the corresponding section of the control logic module, and the load is de-energized if any of the selected conditions or control signals do not satisfy the corresponding Boolean equation, and further whereby the control system is powered by the AC electricity source in series with the loads.

32. A control system as defined in claim 31, further comprising:

(H) indicators, connected to the output of at least a portion of the control module means, for indicating the state of at least one of the conditions.

33. A control system as defined in claim 31, further comprising:

(H) sensor control setting modules electrically connected to the electrical signal generating means and the control module means for setting the predetermined value for at least one of the conditions.

* * * * *